United States Patent Office 3,592,794
Patented July 13, 1971

3,592,794
STABILIZED CONJUGATED DIENE POLYMERS AND COPOLYMERS
William O. Drake and Clive D. Moon, Bartlesville, Okla., assignors to Phillips Petroleum Company
No Drawing. Filed Oct. 24, 1968, Ser. No. 770,419
Int. Cl. C08d 7/10; C08g 5/54
U.S. Cl. 260—45.9
9 Claims

ABSTRACT OF THE DISCLOSURE

Conjugated diene polymers are stabilized to minimize melt flow decrease at elevated temperatures by admixing the polymer of the conjugated diene with 0.1 to 10 parts by weight per 100 parts of polymer of an alkali metal nitrite either alone or together with 0.1 to 5 parts by weight per 100 parts of polymer of an alkali metal bisulfite.

---

This invention relates to stabilized polymers of conjugated dienes. In another aspect, this invention relates to a method for stabilizing polymers of conjugated dienes so as to minimize melt flow decrease at elevated temperatures.

Conjugated diene polymers have many commercial applications because of various desirable physical and chemical characteristics and inexpensiveness of manufacturing. For many applications, these normally solid polymers of conjugated dienes are processed by heating them to a temperature level where they become sufficiently soft to permit incorporation of compounding ingredients and subsequent forming or shaping the polymer into the desired form by various techniques such as extrusion, injection molding, blow molding, centrifugal casting and the like. At the elevated temperatures necessary for processing, many of these polymers exhibit a melt flow decrease, a characteristic which causes problems in compounding and process.

Briefly, melt flow is the amount, in grams, of a polymer that can be forced through an orifice, when subjected to a given force for given time intervals at a given temperature. Melt flow drop off is a decrease in the melt flow from time interval to time interval, usually reaching a relatively constant melt flow. Naturally, if the drop off is too great, the polymer will cease to flow or flow slowly, resulting in the above-mentioned problems.

An example of a processing problem for the fabricator resulting from a melt flow decrease during hot-melt processing is that cycle times for various molding processes are increased because of the longer time required by the less fluid polymer to fill the molds. The producer of the polymer often processes it into a form acceptable for use by the fabricator such as pelletizing the polymer by extrusion techniques. A melt flow decrease during this process results in flow characteristic changes, and therefore different processing characteristics, which can limit the potential applications for the processed polymer.

Various methods proposed for stabilizing these polymers have met with varying degrees of success; consequently, the industry has been striving to find improved methods for stabilizing these materials.

We have found that conjugated diene polymers can be stabilized against melt flow decrease at elevated temperatures by admixing these polymers with small amounts of an alkali metal nitrite or a mixture of an alkali metal nitrite and an alkali metal bisulfite. Conjugated diene polymers stabilized by this invention also have other improved processability characteristics.

An object of this invention is to provide an improved method for stabilizing conjugated diene polymers against melt flow decrease during compounding and processing. Another object of this invention is to provide a new conjugated diene polymer composition capable of being hot-melt processed without decrease of melt flow.

Other objects, advantages and features of this invention will become apparent to one skilled in the art from the following disclosure and claims.

According to the invention, conjugated diene polymers are stabilized to minimize melt flow decrease at elevated temperatures by admixing the conjugated diene polymer with 0.1 to 10 parts by weight per 100 parts of polymer of an alkali metal nitrite or a combination of 0.1 to 10 parts by weight per 100 parts of polymer of an alkali metal nitrite and 0.1 to 5 parts by weight per 100 parts of polymer of an alkali metal bisulfite. The term "alkali metal" as employed herein is used to designate the group consisting of lithium, sodium, potassium, rubidium, and cesium. The term "stabilizing additive" as employed herein is used to designate an alkali metal nitrite either alone or together with an alkali metal bisulfite.

The alkali metal nitrite and alkali metal bisulfite can be added as a mixture or added individually and can be added in varying amounts so long as the quantities stay within the above-mentioned ranges.

The stabilizing additives of this invention can be added to the conjugated diene polymer by any suitable means which effects a homogeneous distribution of the additive in the polymer. The stabilizing additive can be mixed with the conjugated diene polymer in any particulate form, such as granular, pellet, powder, or fluff, by mechanical mixing techniques such as blending, milling, or kneading with devices such as a Henschel mixer, a Banbury mixer, a Waring Blendor, a roll mill, and the like.

Another method of mixing involves dissolving the stabilizing additives in a volatile solvent in which the additives are soluble, such as acetone, ethyl ether, methyl alcohol, ethyl alcohol, propyl alcohol, methyl ethyl ketone, and the like, and then admixing with the polymer, for example, by spraying the particulate polymer with the resultant solution. Such spraying of the particulate polymer can be done, for example, during conveying of the polymer in a screw conveyor or while tumbling the polymer particles in a drum. The concentration of stabilizing additive in the solvent can range from 0.01 weight percent to the additives limit of saturation in the solvent used. The solvent can be subsequently removed by heating, purging with air, or the like.

Another method for incorporating the stabilizing additives involves mixing the stabilizing additives in a water-alcohol solution or any other suspending media and mixing the polymer therewith.

The stabilizing additives of this invention can be effectively employed in conjugated diene homopolymers, copolymers, or mixtures thereof that are subject to decrease of melt flow. Conjugated dienes that are used to form the polymers generally contain from 4 to 12, preferably from 4 to 8 carbon atoms per molecule. Examples of suitable monomers include 1,3-butadiene, isoprene, piperylene, 2,3-dimethyl-1,3-butadiene, 2-methyl-1,3-hexadiene, 1,3-octadiene, 1,3-dodecadiene, 2,5-dimethyl-1,3-decadiene, 4,5-diethyl-1,3-octadiene, and the like. These conjugated dienes can be polymerized to form homopolymers or mixtures of the dienes can be copolymerized to form copolymers. One or more of the conjugated dienes can also be copolymerized with one or more copolymerizable vinyl-substituted aromatic hydrocarbons, in which the vinyl group is attached to a nuclear carbon atom. Examples of vinyl-substituted aromatic hydrocarbons which are usually preferred are styrene, 1-vinylnaphthalene and 3-methylstyrene (3-vinyltoluene). Examples of other compounds which can be advantageously utilized as comonomers include 3,5-diethylstyrene,
4-n-propylstyrene,
2,4,6-trimethylstyrene,
4-dodecylstyrene,
3-methyl-5-n-hexyl-styrene,
4-cyclohexylstyrene,
4-phenylstyrene,
2-ethyl-4-benzylstyrene,
4-p-tolylstyrene,
3,5-diphenylstyrene,
2,3,4,5-tetraethylstyrene,
3-(4-n-hexyl-phenyl)styrene,
3-ethyl-1-vinylnaphthalene,
6-isopropyl-1-vinylnaphthalene,
3,6-di-p-tolyl-1-vinylnaphthalene,
6-chlorohexyl-1-vinylnaphthalene,
8-phenyl-1-vinylnaphthalene,
7-dodecyl-2-vinylnaphthalene, and the like.

The copolymers that can be stabilized by the process of this invention can be block, random, graft, or radial block copolymers. Block copolymers are formed by polymerizing a monomer onto the end of a polymer, the monomer being introduced in such a manner that substantially all of the co-reacting molecules enter the polymer chain at this point. Random copolymers are prepared in the same manner except that a randomizing agent such as tetrahydrofuran is present. Graft copolymers result from the joining of a comonomer to an already formed polymer at random points along the polymer chain. Radial block polymers are formed by reacting a lithium terminated polymer with a compound having at least three reactive sites capable of reacting with the carbon-lithium bond and adding to the carbon possessing this bond in the polymer. The result is a polymer having relatively long branches which radiate from a nucleus formed by the polyfunctional compound which reacted with the lithium terminated polymer.

The stabilizing additives of this invention are particularly applicable as stabilizers for butadiene-styrene copolymers containing 10 to 90 parts butadiene and 90 to 10 parts styrene, i.e., either the rubbery or the resinous end of the spectrum. The polymer to be stabilized can contain other additives such as stress-cracking inhibitors, antioxidants, fillers, dyes, pigments, crosslinking agents, vulcanization accelerators, plasticizers, extenders, and the like. The stabilizing additives of this invention are effective with or without these other additives.

The advantages of this invention are further illustrated by the following examples. The reactants and the proportions and other specific conditions are presented as being typical and should not be construed to limit the invention unduly.

EXAMPLE I

Several samples of butadiene-styrene copolymer were prepared as follows:

(a) Polymer I was a 70 butadiene/30 styrene radial block polymer made according to the following recipe and procedure.

| | Parts by weight |
|---|---|
| Cyclohexane | 800 |
| Styrene | 30 |
| Butadiene | 70 |
| sec-Butyllithium | 0.4 |

The reaction was initiated in the absence of the butadiene at a pressure of 30 p.s.i.g. and a temperature of 125° F. After 2 hours, the butadiene was added to the reaction mixture. After 3 hours, the reaction was terminated by the addition of liquid epoxidized polybutadiene and 0.5 php. 2,6-di-tert-butyl-4-methylphenol. The polymer was then steam-stripped and extruder dried.

(b) Polymer II was a 20 butadiene/80 styrene block copolymer made according to the following recipe and procedure. The stirred reactor containing 544 g. of cyclohexane was heated to 152° F. and the following sequence of charging operations followed.

| Time, minutes: | Temperature, °F. | Pressure, p.s.i.g. | Operation |
|---|---|---|---|
| 0 | 152 | 9 | 200 g. styrene. 182 g. cyclohexane. |
| 16 | 156 | 10 | 0.2 g. n-butyllithium. |
| 18 | 174 | 18 | 136 g. cyclohexane. |
| 47 | 159 | 12 | 50 g. butadiene. |
| 48 | 154 | 22 | 136 g. cyclohexane. |
| 75 | 155 | 15 | Reactor heated to 190° F. |
| 92 | 182 | 30 | 0.85 g. divinylbenzene. 182 g. cyclohexane. |
| 152 | 205 | 38 | Reaction terminated by pouring mixture into 3 liters of isopropyl alcohol. |

The coagulated polymer was separated from the isopropyl alcohol and dried at 210° F.

Various amounts of sodium nitrite and sodium bisulfite were blended into the samples in a Brabender Plastograph. The samples were blended for 7 minutes at 180° C. and 50 r.p.m. under a nitrogen atmosphere. One sample was used as a control and contained no sodium nitrite and no sodium bisulfite. The melt flow of the blend of stabilizers and polymers was measured with a 5000 gram load at temperatures of 200° C. or 230° C. in the melt indexer of ASTM D-1238-62T. The weight of polymer extruded through the orifice in the melt indexer, measured at time intervals of 5, 15, and 30 minutes, is tabulated in Table I, as are the amounts of additives to each sample.

TABLE I

| Polymer | Additive | Amount, php.[1] | Melt flow, dg./min., 200° C. for— | | | Percentage decrease between 5 and 30 min. |
|---|---|---|---|---|---|---|
| | | | 5 min. | 15 min. | 30 min. | |
| I | None | | 3.1 | 2.0 | 0.9 | 71 |
| I | NaNO₂ | 0.5 | 4.8 | 4.3 | 3.4 | 29 |
| I | {NaNO₂ {NaHSO₃ | 0.5} 0.5} | 4.9 | 4.0 | 3.9 | 20 |
| II | None | | 0.14 | 0.065 | 0.035 | 75 |
| II | NaNO₂ | 0.25 | 0.82 | 0.70 | 0.66 | 20 |
| II | NaNO₂ | 0.5 | 0.64 | 0.58 | 0.55 | 16 |
| | | | 230° C. | | | |
| II | None | | 0.18 | | 0.035 | 80 |
| II | NaNO₂ | 0.25 | 3.86 | 2.41 | 2.08 | 46 |
| II | NaNO₂ | 0.5 | 3.24 | 2.72 | 2.08 | 36 |

[1] Parts by weight per 100 parts of polymer.

The data show that adding sodium nitrite or sodium nitrite and sodium bisulfite to the butadiene-styrene copolymer substantially reduces the melt flow decrease of the material.

As will be apparent to one skilled in the art, various modifications can be made in this invention without departing from the scope or spirit thereof.

We claim:
1. A composition stabilized against melt flow decrease at elevated temperatures comprising a hydrocarbon polymer of at least one conjugated diene or a copolymer of a conjugated diene and a vinyl substituted aromatic hydrocarbon in which the vinyl group is attached to a nuclear carbon atom and 0.1 to 10 parts by weight per 100 parts of polymer of an alkali metal nitrite.

2. The composition of claim 1 further comprising 0.1 to 5 parts by weight per 100 parts of polymer of an alkali metal bisulfite.

3. The composition according to claim 2 wherein said alkali metal nitrite is sodium nitrite.

4. The composition according to claim 2 wherein said alkali metal bisulfite is sodium bisulfite.

5. The composition according to claim 2 wherein said conjugated diene is butadiene, said vinyl-substituted aromatic hydrocarbon is styrene, said alkali metal nitrite is sodium nitrite and said alkali metal bisulfite is sodium bisulfite.

6. The composition according to claim 1 wherein said conjugated dienes contain from 4 to 12 carbon atoms per molecule and said vinyl-substituted aromatic hydrocarbon is styrene.

7. The composition according to claim 6 wherein said conjugated diene is butadiene and said vinyl-substituted aromatic hydrocarbon is styrene.

8. The composition according to claim 1 wherein said conjugated dienes contain from 4 to 8 carbon atoms per molecule.

9. The composition according to claim 1 wherein said polymer is a block polymer or a radial block polymer.

References Cited

UNITED STATES PATENTS

| | | | |
|---|---|---|---|
| 2,879,257 | 3/1959 | Walter et al. | 260—45.9 |
| 3,065,193 | 11/1962 | Volk | 260—29.6 |
| 3,325,447 | 6/1967 | Kasparik | 260—45.9 |
| 3,375,222 | 3/1968 | Smith et al. | 260—45.9 |
| 3,413,253 | 11/1968 | Kilbourne | 260—29.7 |

FOREIGN PATENTS

| | | | |
|---|---|---|---|
| 950,022 | 2/1964 | Great Britain | 260—45.9 |

OTHER REFERENCES

Chemical Abstracts, vol. 52, No. 10, May 25, 1958, p. 8556F.

Chemical Abstracts, vol. 55, No. 7, Apr. 3, 1961, p. 6930A.

DONALD E. CZAJA, Primary Examiner

R. W. GRIFFIN, Assistant Examiner

U.S. Cl. X.R.

260—45.7